US006206169B1

(12) United States Patent
Spatafora

(10) Patent No.: US 6,206,169 B1
(45) Date of Patent: Mar. 27, 2001

(54) SUPPLY LINE FOR SUPPLYING PARALLELEPIPED PRODUCTS TO A USER MACHINE

(75) Inventor: Mario Spatafora, Bologna (IT)

(73) Assignee: G. D Societa'per Azioni, Bologna (IT)

( * ) Notice: Subject to any disclaimer, the term of this patent is extended or adjusted under 35 U.S.C. 154(b) by 0 days.

(21) Appl. No.: 09/348,684

(22) Filed: Jul. 7, 1999

(30) Foreign Application Priority Data

Jul. 20, 1998 (IT) .............................................. BO98A0446

(51) Int. Cl.[7] ...................................................... B65G 1/00
(52) U.S. Cl. .................................... 198/347.1; 198/347.3; 198/370.01; 198/778; 198/370.12
(58) Field of Search ..................... 198/347.3, 370.01, 198/370.12, 778, 347.1

(56) References Cited

U.S. PATENT DOCUMENTS

| | | | |
|---|---|---|---|
| 2,789,680 | * | 4/1957 | Kerr . |
| 3,340,992 | * | 9/1967 | Seragnoli . |
| 3,499,555 | * | 3/1970 | Wahle . |
| 4,254,858 | | 3/1981 | Seragnoli ............................ 198/347 |
| 4,344,445 | | 8/1982 | Seragnoli ............................ 131/282 |
| 4,499,987 | * | 2/1985 | Long .................................. 198/347.3 |
| 4,717,010 | | 1/1988 | Deal et al. ........................... 198/347 |
| 4,989,718 | * | 2/1991 | Steeber ............................... 198/347.3 |
| 5,038,909 | * | 8/1991 | Covert ................................ 198/347.3 |
| 5,074,096 | * | 12/1991 | Focke .................................. 53/133.5 |
| 5,413,213 | * | 5/1995 | Golz et al. .......................... 198/778 |
| 5,490,598 | * | 2/1996 | Golz et al. . |
| 5,669,481 | * | 9/1997 | Neri et al. .......................... 198/347.3 |
| 5,771,666 | | 6/1998 | Bertuzzi et al. ..................... 53/466 |
| 5,964,562 | * | 10/1999 | Bernard, II et al. ............. 414/331.03 |

FOREIGN PATENT DOCUMENTS

| | | |
|---|---|---|
| 4119514 | 12/1992 | (DE) . |
| 0658495 | 6/1995 | (EP) . |
| 1559796 | 1/1980 | (GB) . |
| 2301807 | 12/1996 | (GB) . |

\* cited by examiner

Primary Examiner—Christopher P. Ellis
Assistant Examiner—Richard Ridley

(57) ABSTRACT

A supply line for supplying parallelepiped products to a user machine, whereby the products are fed to the user machine by a conveyor which feeds the products along a horizontal path and through a transfer station where a transfer unit removes the products off the conveyor and feeds the products to an input-output of a vertical store in which the products are stored contacting one another; the transfer unit being reversible for also removing the products from the input-output of the store and feeding the products onto the conveyor.

14 Claims, 5 Drawing Sheets

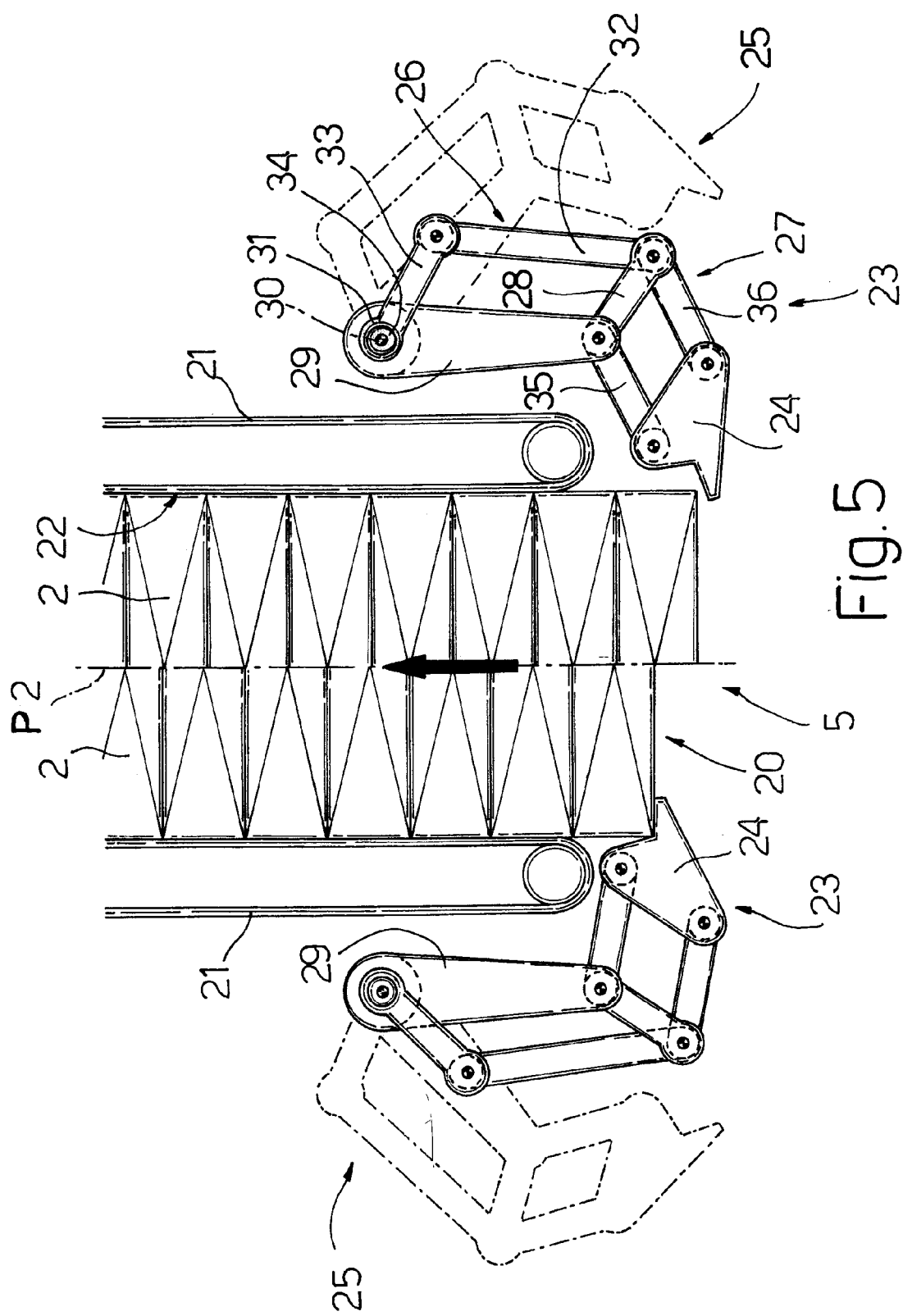

SUPPLY LINE FOR SUPPLYING PARALLELEPIPED PRODUCTS TO A USER MACHINE

The present invention relates to a supply line for supplying parallelepiped products to a user machine.

The present invention may be used to advantage on supply lines for supplying packets of cigarettes from a packing machine to a cellophaning machine, to which the following description refers purely by way of example.

BACKGROUND OF THE INVENTION

Systems for manufacturing packets of cigarettes normally feature horizontal supply lines for connecting packing machines to respective cellophaning machines. During operation of the system, variations in the respective speeds of each packing machine and the corresponding cellophaning machine occur fairly frequently, due, for example, to one of the machines jamming or being arrested for cleaning and/or adjustment. To compensate for such variations without one of the machines having to be slowed down to accommodate the temporary reduction in speed of the other, it is common practice to provide an intermediate store along the supply line between the two machines.

Known stores, such as the one described in GB-A-1559796, are substantially horizontal and, being run through by the supply line, are relatively bulky in comparison to the loading capacity, and are not normally very flexible, i.e. capable of receiving packets of cigarettes of different types.

U.S. Pat. No. 4,717,010 discloses a cigarette pack store utilizing a rotating pack accumulating drum having a plurality of cigarette pack accumulating columns equally spaced about its periphery. Each such column guides a pack support pedestal for movement either downwardly during pack accumulation, or upwardly during pack discharge. Packs of cigarettes may be removed from a production line and accumulated, they may be stored, or they may be stored, or they may be removed from the accumulating columns and returned to the production line.

The cigarette pack store disclosed in U.S. Pat. No. 4,717,010 is an improvement in respect to the known stores, such as that described in GB-A1-1559796, but is relatively complicated, i.e. expensive, to produce.

SUMMARY OF THE INVENTION

It is an object of the present invention to provide a supply line designed to eliminate the aforementioned drawbacks, and which at the same time is cheap and easy to produce.

According to the present invention, there is provided a supply line for supplying parallelepiped products to a user machine, the line comprising a conveyor for feeding said products along a given path; a store for storing said products contacting one another, and comprising a further reversible continuous conveyor and an input-output for said products; and a transfer unit for removing said products successively off said conveyor and feeding the products to said input-output, and which is reversible for removing said products successively from said input-output and feeding the products to said conveyor; said input-output comprising a conveying device for receiving said products successively from said transfer unit and arranging said products contacting one another.

BRIEF DESCRIPTION OF THE DRAWINGS

A non-limiting embodiment of the present invention will be described by way of example with reference to the accompanying drawings, in which:

FIGS. 4, 5 and 6 show plan, views, with parts removed for clarity, of details in FIG. 2.

DETAILED DESCRIPTION OF THE INVENTION

Figure 1:
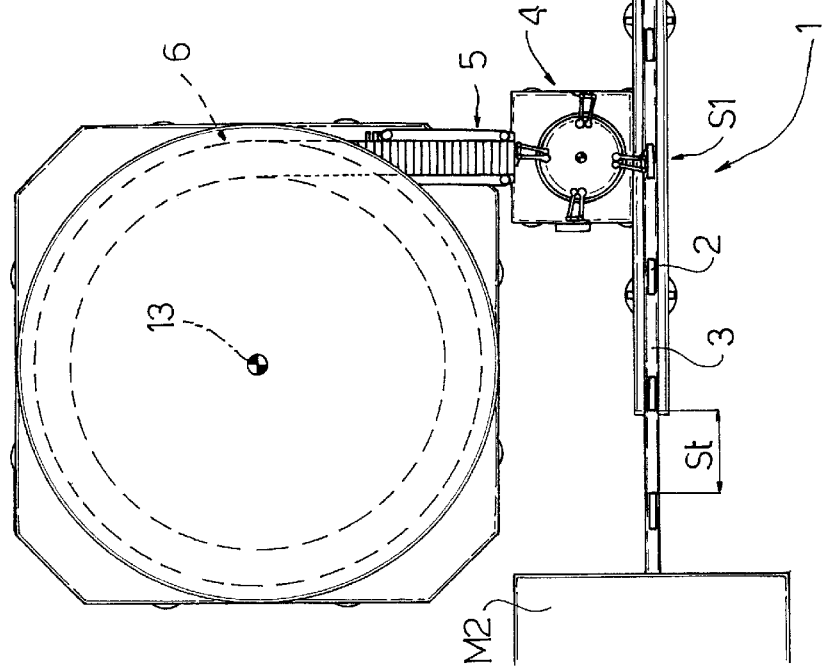
FIG. 1 shows a schematic plan view of a preferred embodiment of the line according to the present invention.

Number 1 in FIG. 1 indicates as a whole a supply line for supplying packets 2 of cigarettes from a packing machine M1 to a cellophaning machine M2. Line 1 comprises a continuous conveyor 3 for feeding packets 2 along a straight, horizontal path P1 and through a transfer station S1 where a transfer unit 4 removes packets 2 successively off conveyor 3 to feed packets 2 to an input-output 5 of a store 6, and is reversible for removing packets 2 successively from input-output 5 to feed packets 2 to conveyor 3.

Figure 2:
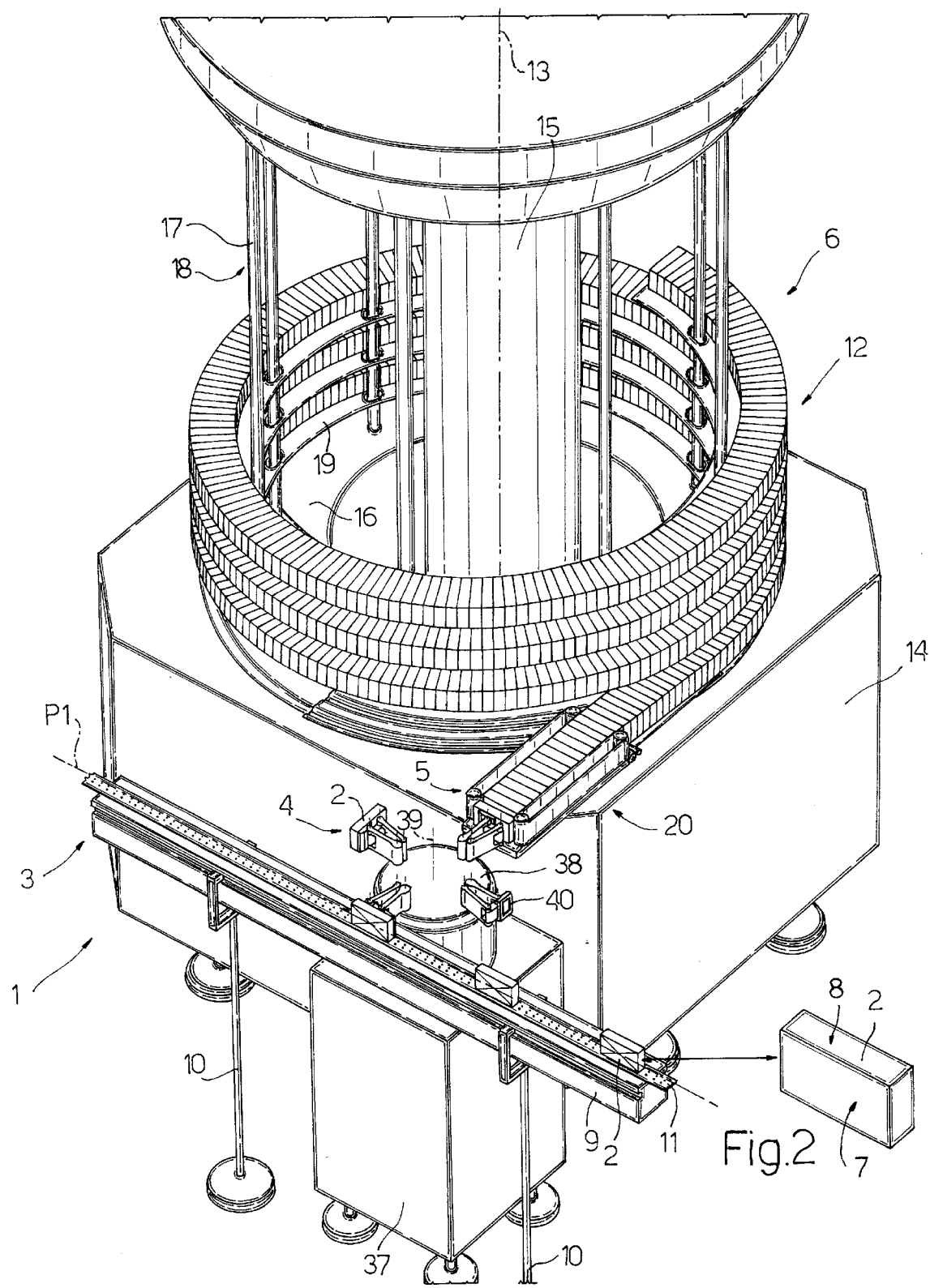
FIG. 2 shows a view in perspective of a detail in FIG. 1.

As shown in FIG. 2, each packet 2 is substantially parallelepiped, and comprises two opposite parallel base surfaces 7, and a lateral surface 8 perpendicular to surfaces 7.

Conveyor 3 comprises a beam 9 resting on supports 10 and supporting a porous belt 11 running at constant speed over a suction chamber (not shown) formed in beam 9. Each packet 2 is positioned with one face of lateral surface 8 contacting belt 11, on which the packet is retained by suction and fed along path P1.

Store 6 is a known LIFO (last in first out) type (as described, for example, in Patents U.S. Pat. No. 4,254,858, GB-A1-2301807 or EP-A1-658495) and comprises a continuous reversible conveyor 12 coiling about a vertical axis 13 from input-output 5, and in which packets 2 are stored contacting one another along base surfaces 7.

Store 6 comprises a frame 14 supporting a fixed central drum 15 coaxial with axis 13 and having a cylindrical helical outer guide (not shown), and a powered carousel conveyor 16 coaxial with axis 13 and supporting a number of vertical rods 17 defining, about central drum 15, a cage 18 rotating with carousel conveyor 16.

Conveyor 12 is defined by a flexible conveyor belt 19, which coils about axis 13, is connected to rods 17 to slide axially along rods 17, and is connected in sliding manner to said helical guide (not shown).

In actual use, carousel conveyor 16 is rotated about axis 13 in a given direction (anticlockwise in FIG. 2) to increase the number of packets 2 on belt 19, and is rotated in the opposite direction to reduce the number of packets 2 on belt 19.

As shown in FIG. 5, input-output 5 of store 6 comprises a reversible conveyor 20, which, in a first operating mode, receives packets 2 successively from transfer unit 4, positions packets 2 contacting one another, and feeds packets 2 onto belt 19, and which, in a further operating mode, receives packets 2, contacting one another, from belt 19, and feeds packets 2 successively to transfer unit 4.

Conveyor 20 comprises two reversible conveyor belts 21 arranged parallel to and facing each other to define a channel 22 for feeding packets 2 along a straight path P2 substantially tangent to belt 19. An inserting device 23 is provided at the input of channel 22 to insert inside channel 22 the packets 2 supplied by transfer unit 4.

Inserting device 23 comprises two bodies 24, which engage respective ends of each packet 2 and are activated by respective actuators 25, each comprising two articulated parallelograms 26 and 27 having a crank 28 in common.

Parallelogram 26 comprises a frame defined by an arm 29, which is hinged to frame 14 and oscillated by a shaft 31 with respect to frame 14 and about a vertical axis 30 perpendicular to path P2; parallelogram 26 also comprises a connecting rod 32 connected to arm 29 by crank 28 and by a crank 33 hinged to frame 14 and oscillated, with respect to frame 14 and about axis 30, by a shaft 34 coaxial with shaft 31; and parallelogram 27 comprises two connecting rods 35 and 36 connecting crank 28 to body 24, which defines a second crank of parallelogram 27.

When arm 29 is oscillated by shaft 31 about axis 30, body 24 is moved between a rest position (shown by the dot-and-dash line in FIG. 5) and a work position (shown by the continuous line in FIG. 5) in which body 24 is positioned along path P2; and, when crank 33 is oscillated about axis 30 by shaft 34, body 24 is moved substantially along path P2 to push a packet 2 into channel 22.

Figure 3:
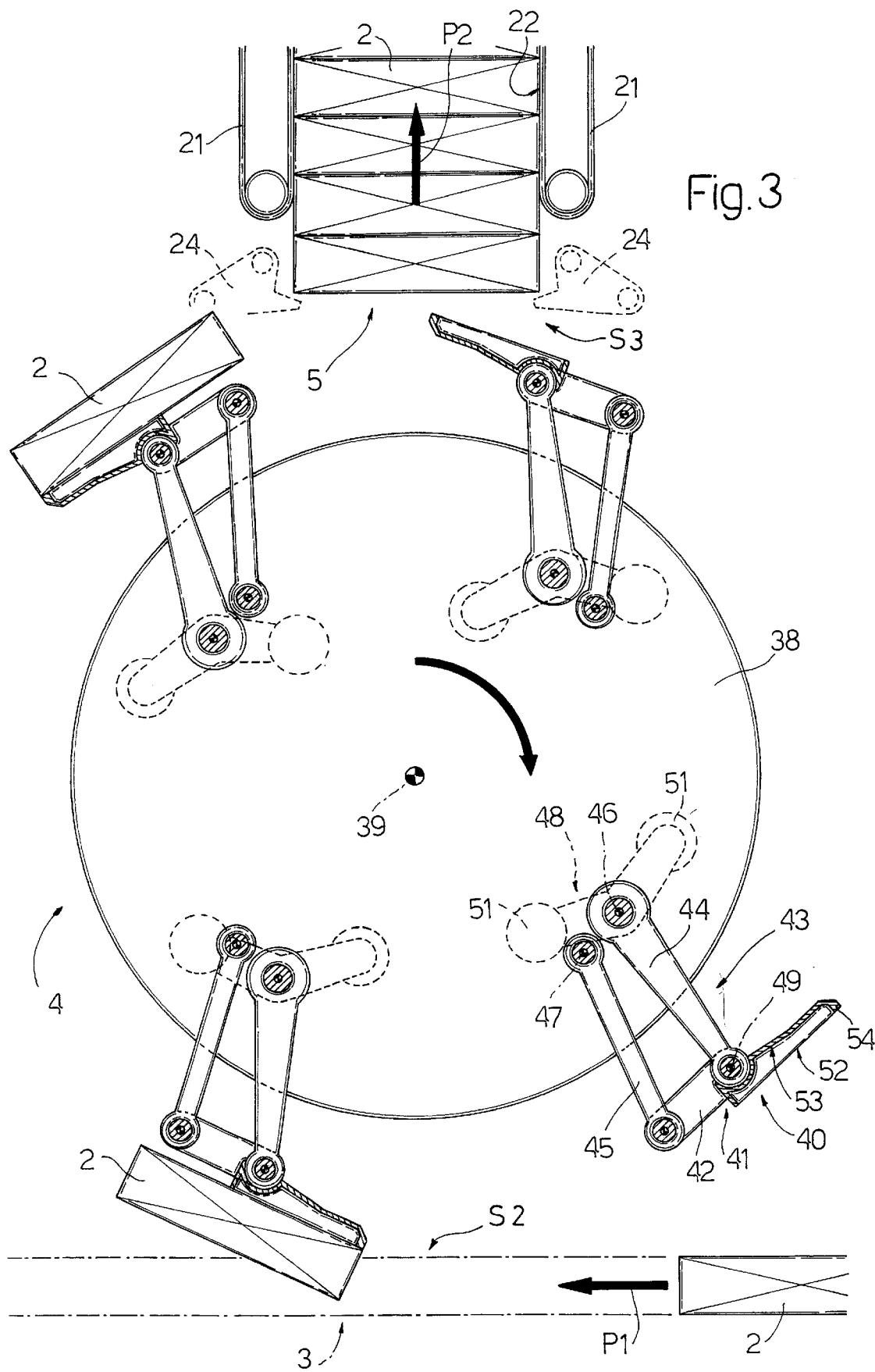
FIG. 3 shows a schematic larger-scale plan view of a detail in FIG. 2.

As shown in FIGS. 2 and 3, transfer unit 4 comprises a frame 37 supporting a wheel 38 rotating continuously (clockwise in FIG. 3) about a vertical axis 39 parallel to axis 13 and crosswise to paths P1 and P2; and wheel 38 supports a number of suction gripping heads 40 equally spaced about axis 39 and each for retaining a respective packet 2.

As wheel 38 rotates continuously about axis 39, each head 40 is fed cyclically along a substantially circular path extending about axis 39 and through a switch station S2 located along conveyor 3, and a further switch station S3 located an input-output 5 of store 6.

Wheel 38 is rotated about axis 39 in the same direction (clockwise in FIG. 3) at all times and at an angular speed depending on the traveling speed of conveyor 3, so that each head 40 is always fed through switch station S2 in time with conveyor 3. More specifically, each head 40 is fed through switch station S2 in time with and to pick up a respective packet 2, or is fed through switch station S2 to deposit onto conveyor 3 a respective packet 2 separated by spacing St from the adjacent upstream and downstream packets 2.

Each gripping head 40 defines a first arm of a rocker arm 41, which comprises a second arm 42 defining the connecting rod of an articulated parallelogram 43 comprising two cranks 44 and 45 hinged to wheel 38 and oscillated, with respect to wheel 38 and about respective axes 46 and 47 parallel to axis 39, by a cam control device 48 connected to crank 44, which is hinged to rocker arm 41 to oscillate with respect to rocker arm 41 about an axis 49.

Figure 4:
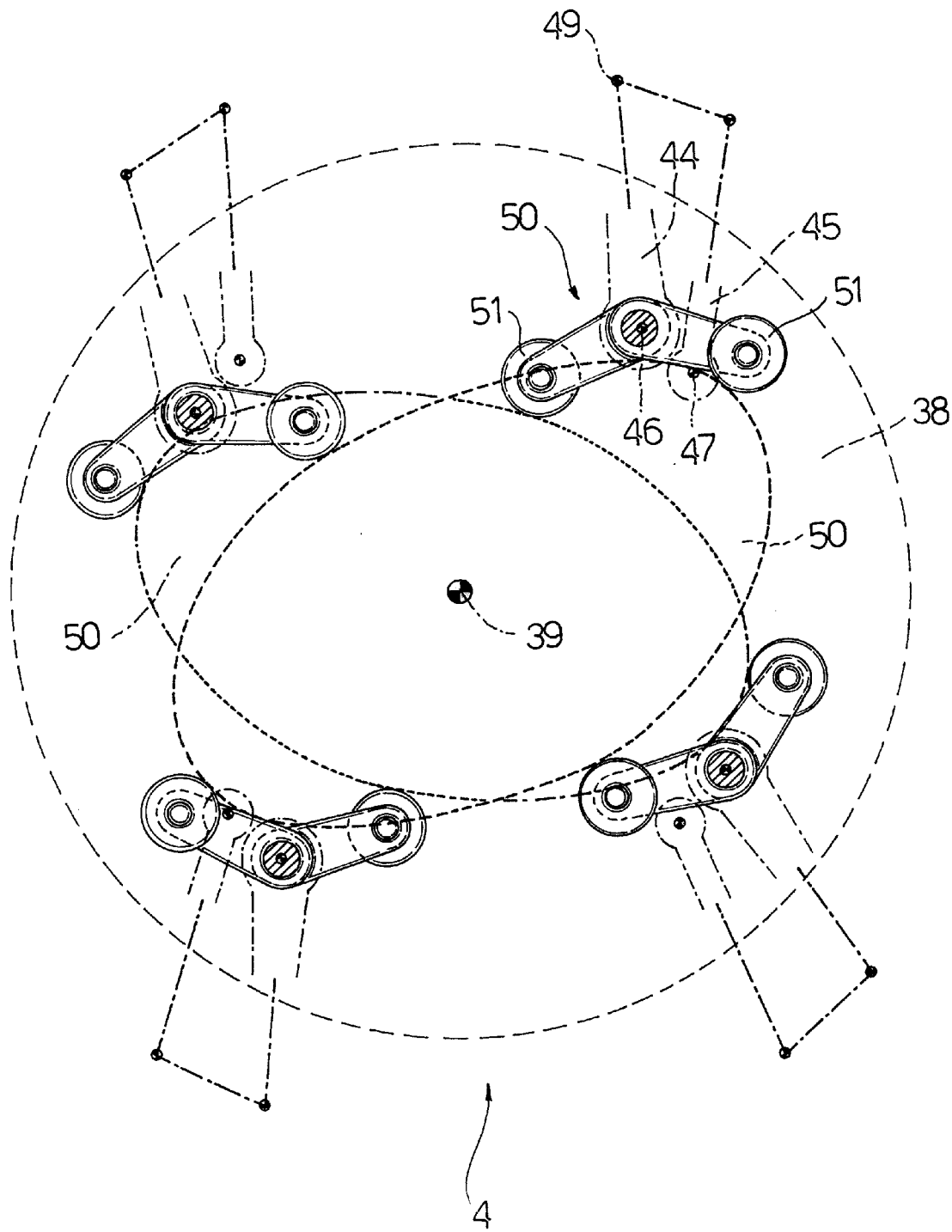

As shown in FIG. 4, cam control device 48 comprises two fixed cams 50 extending about axis 39; and two tappet rollers 51, each of which cooperates with a respective cam 50 and is supported by respective crank 44. As each head 40 travels through switch station S2, control device 48 oscillates respective crank 44 about respective axis 46 to keep head 40 parallel to path P1 for a long enough interval to enable head 40 to remove a respective packet 2 by suction off conveyor 3, or to deposit a respective packet 2 onto conveyor 3.

As each head 40 travels through switch station S3, control device 48 oscillates respective crank 44 about respective axis 46 to keep head 40 in a fixed position facing input-output 5 of store 6 for a long enough interval to enable head 40 to withdraw a respective packet 2 by suction from input-output 5, or to deposit a respective packet 2 at input-output 5.

Figure 6:
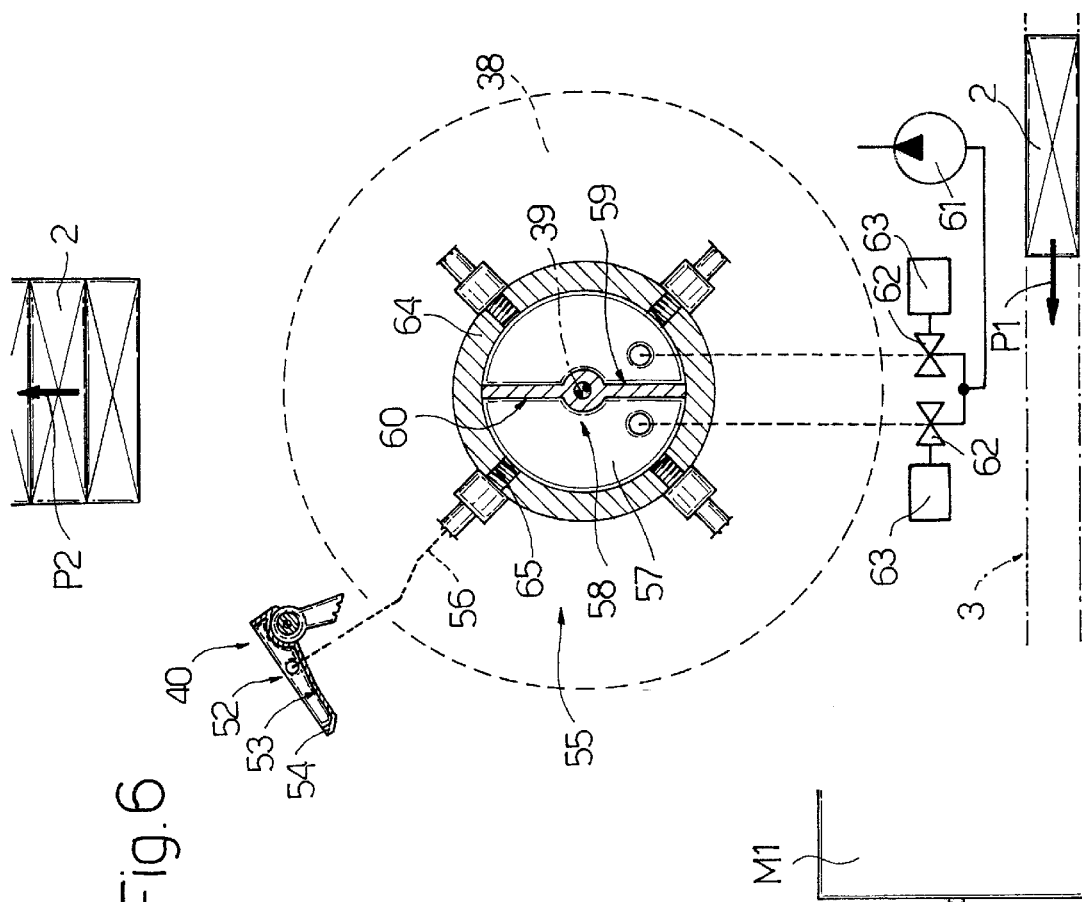

As shown in FIG. 6, each gripping head 40 is in the form of a plate, which is connected on one side to respective crank 44, and is defined on the other side by a gripping surface 52 in which is formed a cavity 53 defined by an annular edge 54 and connected pneumatically by a conduit 56 to a suction device 55 for generating a vacuum inside cavity 53 to retain respective packet 2 on gripping surface 52.

Suction device 55 comprises a fixed central distributor 57 housed coaxially inside wheel 38 and having a chamber 58, which is formed along the whole of the outer periphery of distributor 57 and is divided into two equal contiguous sections 59 and 60 isolated pneumatically from each other. Each section 59, 60 is connected to a suction pump 61 via a respective valve 62 controlled by a control device 63.

Suction device 55 also comprises a tubular body 64, which is coaxial and rotates with wheel 38, cooperates with distributor 57, and has, for each gripping head 40, a through hole 65 connected pneumatically at one end to distributor 57 and at the other end to respective cavity 53 via respective conduit 56.

Section 59 is so formed on distributor 57 as to be connected to each hole 65 as respective head 40 travels from switch station S2 to switch station S3; and section 60 is so formed on distributor 57 as to be connected to each hole 65 as respective head 40 travels from switch station S3 to switch station S2.

Control device 63 activates suction in section 59 or in section 60, depending on whether transfer unit 4 is called upon to remove a packet 2 off conveyor 3 and feed it to input-output 5, or vice versa.

More specifically, control device 63 controls respective valve 62 to activate suction in section 59 when transfer unit 4 is called upon to remove a packet 2 off conveyor 3 and feed it to input-output 5, i.e. as respective head 40 feeds packet 2 from switch station S2 to switch station S3. And conversely, control device 63 controls respective valve 62 to activate suction in section 60 when transfer unit 4 is called upon to remove a packet 2 from input-output 5 and feed it to conveyor 3, i.e. as respective head 40 feeds packet 2 from switch station S3 to switch station S2.

In actual use, control device 63 determines the supply F1 of packets 2 from packing machine M1 and the supply F2 of packets 2 to cellophaning machine M2, and, if supplies F1 and F2 are substantially equal, sets transfer unit 4 to a rest condition. Conversely, in the event of a difference between supplies F1 and F2, control device 63 activates transfer unit 4.

More specifically, if supply F1 is greater than supply F2, i.e. if packing machine M1 is producing more packets 2 than can be absorbed by cellophaning machine M2, control device 63 activates transfer unit 4 to remove packets 2 successively off conveyor 3 and feed packets 2 to input-output 5 of store 6.

Conversely, if supply F1 is less than supply F2, i.e. if packing machine M1 is producing fewer packets 2 than those absorbed by cellophaning machine M2, control device 63 activates transfer unit 4 to remove packets 2 successively from input-output 5 of store 6 and feed packets 2 onto conveyor 3 with spacing St.

In an alternative embodiment not shown, control device 63 only activates some of gripping heads 40 to remove off or deposit onto conveyor 3, for example, one out of every two packets 2 traveling through transfer station S1.

In a further embodiment not shown, transfer unit 4 cooperates with a control device and with a reject device for rejecting any faulty packets 2.

When conveyor 3 of line 1 feeds packets 2 with a given spacing st along path P1, transfer unit 4 is capable of removing packets 2 successively off conveyor 3 to feed packets 2 to an input-output 5 of a store 6, and is reversible to remove packets 2 successively from input-output 5 and feed packets 2 onto conveyor 3 with spacing St.

What is claimed is:

1. A supply line for supplying parallelepiped products (2) to a user machine (M2), the line (1) comprising a conveyor (3) for feeding said products (2) along a given path (P1); a store (6) for storing said products (2) contacting one another, and comprising a further reversible continuous conveyor (12) and an input-output (5) for said products (2); and a transfer unit (4) for removing said products (2) successively off said conveyor (3) and feeding the products (2) to said input-output (5), and which is selectively operable for removing said products (2) successively from said input-output (5) and feeding the products (2) to said conveyor (3); said input-output (5) comprising a conveying device (20) for receiving said products (2) successively from said transfer unit (4) and arranging said products (2) contacting one another.

2. A line as claimed in claim 1, wherein said path (P1) is substantially horizontal, and said store (6) is vertical.

3. A line as claimed in claim 1, wherein said conveying device (20) comprises two reversible conveyor belts (21) positioned parallel to and facing each other to define a channel (22) for conveying said products (2).

4. A line as claimed in claim 3, wherein said conveying device (20) comprises inserting means (23) for inserting into said channel (22) said products (2) supplied by said transfer unit (4).

5. A line as claimed in claim 1, wherein said transfer unit (4) comprises a wheel (38) rotating continuously about a first axis (39) crosswise to said path (P1); at least one gripping head (40) for retaining a said product (2); and articulated connecting means (43) interposed between said gripping head (40) and said wheel (38).

6. A line as claimed in claim 5, wherein said articulated connecting means (43) comprise a first arm (44) interposed between said gripping head (40) and said wheel (38); said first arm (44) being hinged to said wheel (38) to oscillate, with respect to said wheel (38), about a second axis (46) parallel to said first axis (39); and a cam control device (48) being provided to control the angular position of said first arm (44) about said second axis (46).

7. A line as claimed in claim 6, wherein said cam control device (48) comprises two fixed cams (50) extending about said first axis (39); and two tappet rollers (51), each of which cooperates with a respective said cam (50).

8. A line as claimed in claim 6, wherein said gripping head (40) is hinged to said first arm (44) to oscillate, with respect to said first arm (44), about a third axis (49) parallel to said first axis (39).

9. A line as claimed in claim 8, wherein said articulated connecting means (43) comprise a rocker arm (41), which is hinged to said first arm (44) to oscillate, with respect to said first arm (44), about said third axis (49), and in turn comprises a second arm (40) defining said gripping head (40), and a third arm (42); said articulated connecting means (43) also comprising a fourth arm (45) hinged at one end to said third arm (42) and at the opposite end to said wheel (38) to oscillate, with respect to said wheel (38), about a fourth axis (47) parallel to said first axis (39).

10. A line as claimed in claim 9, wherein said third arm (42) defines a connecting rod of an articulated parallelogram (43), of which said first (44) and fourth (45) arms define respective cranks.

11. A line as claimed in claim 5, and also comprising a suction device (55) connected pneumatically to said gripping head (40) to generate suction through the gripping head (40).

12. A line as claimed in claim 11, wherein said suction device (55) comprises a suction pump (61); a central fixed distributor (57) housed coaxially in said wheel (38) and having a chamber (58) formed in the outer periphery of the distributor (57) and divided into two contiguous, pneumatically isolated sections (59, 60); a tubular body (64), which is integral and coaxial with said wheel (38), cooperates with the fixed said distributor (57), and has a hole (65) connected pneumatically to said gripping head (40) to pneumatically connect the gripping head (40), in use, with said chamber (58); and two valves (62) activated selectively to connect said pump (61) to one or other of said two sections (59, 60).

13. A line as claimed in claim 1, wherein said store (6) comprises a fixed central drum (15) having a cylindrical helical outer guide; a continuous belt (19) coiling about said central drum (15) and connected in sliding manner to said guide; and reversible actuating means (16, 17) for rotating said belt about said central drum (15); said belt (19) defining a movable surface for supporting said products (2).

14. A line as claimed in claim 13, wherein said actuating means (16) comprise a powered carousel conveyor (16) coaxial with said central drum (15); and a number of vertical rods (17) integral with said carousel conveyor (16) and defining, about said central drum (15), a cage (18) rotating with said carousel conveyor (16) and connected in axially-sliding manner to said belt (19).

\* \* \* \* \*